United States Patent [19]

Wiederkehr

[11] 4,402,476
[45] Sep. 6, 1983

[54] EXHAUST VALVE AND MANEUVERING STRUCTURE FOR LIGHTER-THAN-AIR AIRCRAFT

[76] Inventor: Matthew H. Wiederkehr, 1604 Euclid St., St. Paul, Minn. 55106

[21] Appl. No.: 763,511

[22] Filed: Jan. 28, 1977

[51] Int. Cl.³ .............................................. B64B 1/62
[52] U.S. Cl. ...................................... 244/99; 244/31; 244/97
[58] Field of Search ....................... 244/31, 96, 97, 99, 244/152

[56] References Cited

U.S. PATENT DOCUMENTS

| | | | |
|---|---|---|---|
| 1,290,979 | 1/1919 | Griffith | 244/97 |
| 2,404,659 | 7/1946 | Rohulick | 244/152 |
| 2,526,719 | 10/1950 | Winzen | 244/31 |
| 3,860,201 | 1/1975 | Hall | 244/99 |
| 3,945,592 | 3/1976 | Sutton | 244/152 |
| 4,033,527 | 7/1977 | Parsons | 244/99 |

FOREIGN PATENT DOCUMENTS

| | | | |
|---|---|---|---|
| 385849 | 11/1923 | Fed. Rep. of Germany | 244/99 |
| 127633 | 6/1919 | United Kingdom | 244/99 |
| 130657 | 8/1919 | United Kingdom | 244/97 |

*Primary Examiner*—Charles E. Frankfort
*Attorney, Agent, or Firm*—John C. Barnes

[57] ABSTRACT

A lighter-than-air (LTA) aircraft having a valve structure affording the rapid removal of the lifting gas. The valve comprises a circular panel sewn within the envelope about an upper opening in the envelope for approximately one-third of its periphery and sealed thereabout by a releasable fastening tape. The sewn portion and tape portion of the valve being spaced 5 to 10 inches from the opening. A drape may extend beyond and depend from the fastening tapes. Gas may be exhausted from the aircraft in flight by collapsing opposed sides to force gas from a lower opening as is present in hot air balloons.

6 Claims, 6 Drawing Figures

EXHAUST VALVE AND MANEUVERING STRUCTURE FOR LIGHTER-THAN-AIR AIRCRAFT

BACKGROUND OF THE INVENTION

1. Field of the Invention

This invention relates to improvements in lighter-than-air aircraft and more specifically to improvements in the deflating valve and the lift control structure for hot air balloons.

2. Description of the Prior Art

The need for a valve in the upper portion of a lighter-than-air (LTA) aircraft is well recognized to permit the rapid removal of the inflating and or lifting gas from the aircraft. This is desirable to avoid serious injury when landing a hot air balloon in the wind. After the balloon touches the ground the wind will drag the gondola if the top cannot be opened to allow the wind to force the lifting gas from the balloon envelope. It is at times necessary, and therefore desirable to close the opening after it is once opened to permit the balloon to contain and again fill with hot air before it has been collapsed. The valve must therefore be structured to close by air pressure when the opening cable is released. This is done only by the pressure of the escaping gas.

Prior known and available deflating or exhaust valves have included a circular panel sewn partially about the reinforcing or load tape sewn about the opening and this panel is otherwise sealed by a releasable fastening tape around the remainder of the opening. The fastening tape is typically hook and loop tape constructed of polymeric material. This valve is opened by a deflation strap attached to the panel diametrically opposite the sewn area and extending therefrom through a ring on the balloon envelope down to the gondola. After it is once pulled the panel could not close the opening because the air pressure folds it so it would not fill the opening to seal it. Further, this valve, during operation with the panel fully sealed, allowed the gas to leak through the polymeric hooks and loops. In a hot air balloon this gas is at a temperature of about 275° F. which has a deleterious effect on the hooks and loops, degrading their holding strength. After as few as fifty hours of flight this hot gas substantially destroys the seal and little force, e.g. only 10 lbs of pull as opposed to 50 lbs when new, is ncessary to open the valve. With the holding capability of the hook and loops lost, tops have been known to be opened by the weight of the deflation strap, comprising a cable terminating in a strap on the lower end. Improvement on this valve is afforded by the present invention.

Another prior art valve is known as the parachute valve. This valve comprises a panel about twenty feet in diameter and located at the very inner apex of the balloon envelope. Spaced cords or lines from perimeter points on the panel are joined at a lower point to a single release or control line. The lines from the perimeter also extend to sewn points on the inner envelope to avoid displacement of the panel from the opening in the balloon. When the control line is pulled the panel is drawn from the opening allowing gas to escape through the opening. The gas will let the envelope reseal the opening when the control line is released. This valve relies entirely on gas pressure and has no mechanical securing system.

Control valves for adjusting the height of a balloon by releasing air is illustrated in U.S. Pat. No. 3,860,201, issued Jan. 14, 1975, to Ralph H. Hall.

The present invention affords a new method of deflating the balloon temporarily to let the balloon collapse and seek a lower altitude.

SUMMARY OF THE INVENTION

The present invention affords an improved LTA aircraft and particularly an improved deflating valve. The improved valve comprises a large diameter panel sewn at its perimeter, about a portion thereof, within the envelope about the upper opening and spaced radially therefrom. The remainder of the panel is secured by a two-part releasable fastening tape about the periphery. The heated gas presses the panel against the envelope between the fastening tape and the load tape at the opening. This provides an additional seal which reduces the leaking of hot gases between the tapes and increases the life of the tape. The increased diameter of the panel, exceeding the size of the opening, also permits the panel to more positively close the opening if released after once being opened. Additionally an effective seal can be assured by extending the panel beyond the tape to form a drape which will seal the tape from the inside and will provide additional material to cover the opening to reseal the opening if desired. A drape may be sewed within the envelope inside the position of the sealing tape which is sewn inside the balloon. This drape can seal the gap between the fastening tape in normal flight and once opened the drape can be drawn over a portion of the opening for the purpose of resealing the exhaust opening.

The balloon structure also has means for collapsing the balloon to allow the same to descend or reduce an ascent rate. The balloon size determines its lifting ability. When hot air or gas is removed the balloon will descend. The collapsing structure of this invention comprises a ring sewn to a load tape on one side of the balloon and one on the opposite side. A cable is joined to one ring and extends through the other ring to the gondola. Pulling the cable will draw the opposed rings collapsing the sides together to force air from the opening in the bottom.

The present invention provides increased safety in lighter-than-air aircraft. This is so by improving the deflating valve at the unsealing and resealing surfaces thereof and by removing the additional opening in the aircraft for the maneuvering valve.

Having briefly described the invention it will be more fully described hereinafter with reference to the accompanying drawing.

DETAILED DESCRIPTION OF THE PREFERRED EMBODIMENT

Figure 1:
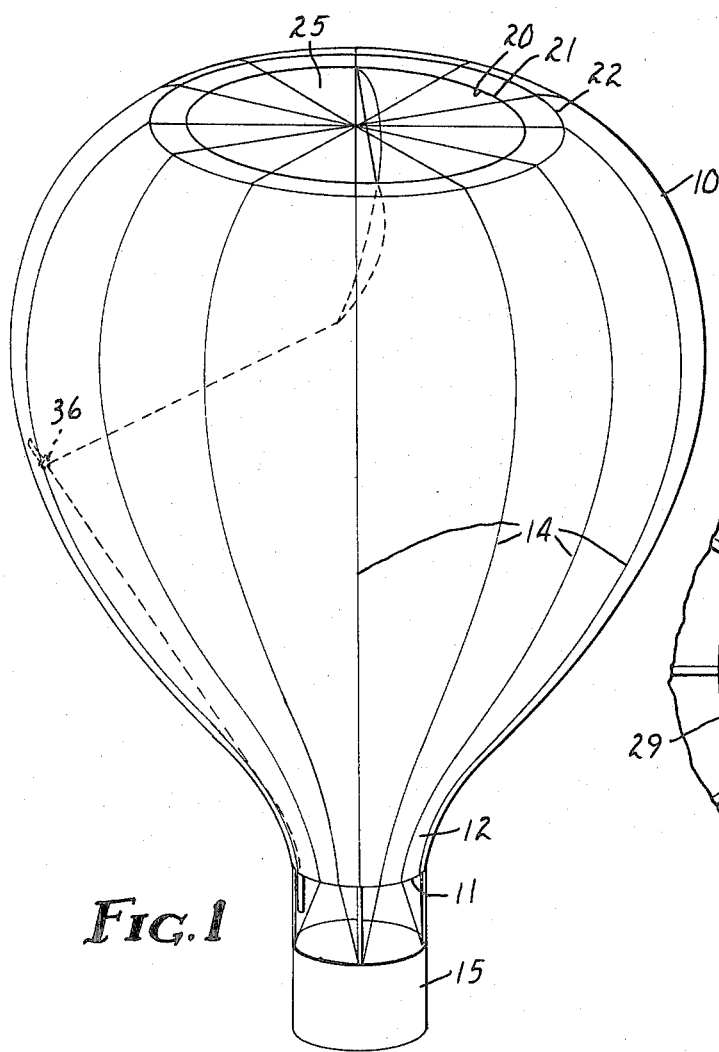
FIG. 1 is a partial perspective view of a hot air balloon showing at the top thereof a valve according to the present invention.
Figure 2:
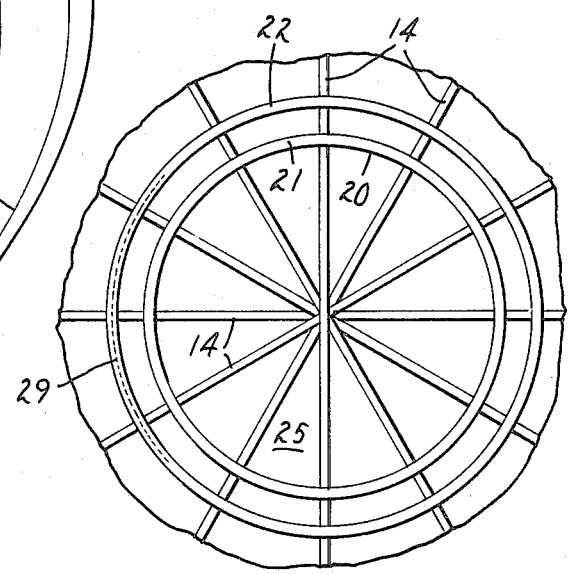
FIG. 2 is a fragmentary top view of the balloon structure.

FIG. 1 illustrates a lighter-than-air aircraft in the form of a hot air balloon substantially inflated as when in flight. The balloon envelope 10 is filled with hot air produced by a gas burner disposed below an opening 11 at the lower end 12 just above the pilot's head. Load tapes or lines 14 are uniformly spaced about the balloon envelope. Each tape 14 extends from a position at the lower end over the top of the balloon and back to the lower end. These tapes are gathered into groups at the bottom and extend to the gondola or basket 15 for the pilot. The gas burner is supported above the basket for heating air in the balloon envelope 10. In operation, the pilot controls the burner to maintain the balloon aloft and descent is accomplished by expelling the hot air from inside the balloon, collapsing the same. When the balloon reaches the ground a rapid collapsing of the balloon avoids having the balloon drag the basket over the ground. This is done by opening the exhaust valve at the very top of the balloon.

The exhaust valve of the present invention comprises a large diameter panel releasably secured within the top of the balloon in normal flight.

The load tapes 14 are sewn to the balloon envelope and cross one another at the top. An opening 20 is formed in the top and a load tape 21 is sewn over the load tapes and to the envelope at the opening. A second load tape 22 is sewn around the first tape 21 in a circular pattern about 5 to 10 inches from the first tape on the outside of the balloon, preferably seven inches.

A large circular panel 25 of envelope material is sewn along about one-third of its periphery to the inside of the balloon opposite the load tape 22. A releasable fastening tape is used to hold the rest of the panel 25 against the inside of the balloon envelope 10. The releasable tape is preferably constructed according to the disclosure of U.S. Pat. No. 3,009,235 of de Mestral, issued Nov. 21, 1961, incorporated herein by reference thereto. The tape is a fibrous tape material comprising loop material on one backing and hook-shaped material on the other backing which adheres to the loop material.

One backing 27 of a tape material five-eights of an inch to one inch wide is sewn to the balloon envelope opposite tape 22 by a double needle machine with needles about one-half inch apart. The stitching is done down the middle of the tape. The tape 27 extends from the ends of the stitching 29 sewing the panel to the tape 27 about the opening 20. The other backing 30 of the tape is sewn to the panel 25 to be opposite the tape 27. Additional strips 31 of tape backing corresponding to the backing 27 are sewn to the load tapes 14 between the tape 27 and the opening 20. This tape 27 is preferably the hook material.

The tape 27 and the tape 30 normally hold the panel in place across the opening 20. The pressure of the air against the balloon causes the panel 25 to press against the inside of the envelope between the tape 27 and the opening 20. This sealing of the panel restricts the flow of hot gases between the tapes as it restricts by this seal the flow between the areas of different pressure. Should the panel be opened or the pressure overcome the shear strength of the tape, the strips 31 contact the tape 30 to restrict further displacement.

The loose edges of the tapes 27 and 30 cause these strips to seal tightly. It causes the separation of the strips to be both by overcoming shear loads and peel strength of the tape.

Figure 3:
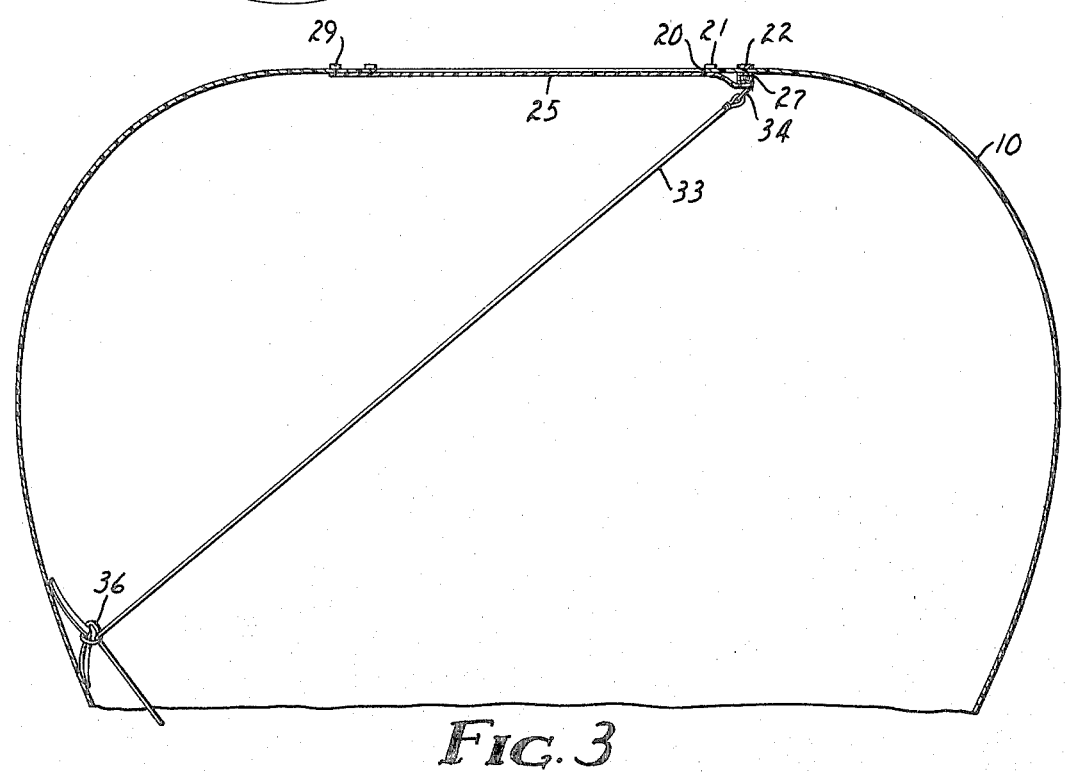
FIG. 3 is a fragmentary vertical sectional view of the balloon.
Figure 4:
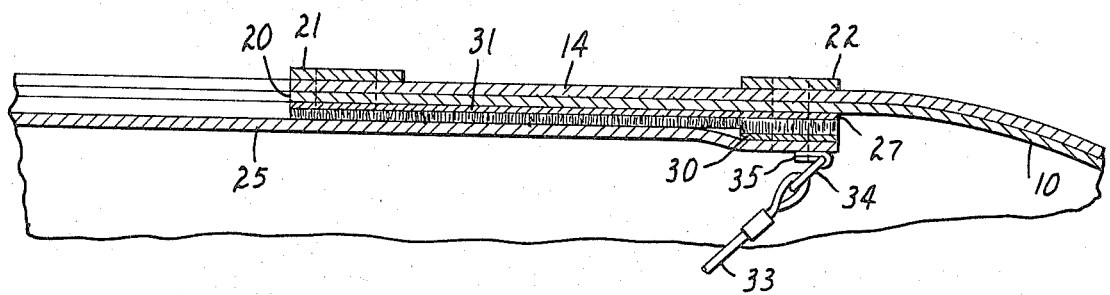
FIG. 4 is an enlarged detail sectional view.
Figure 5:
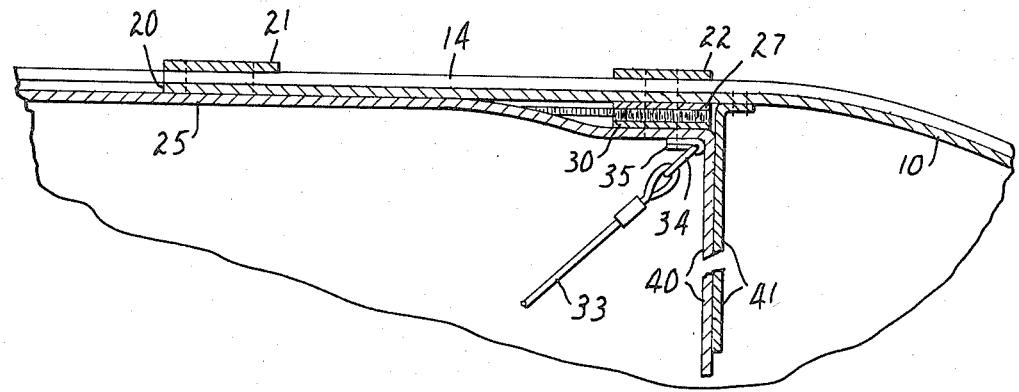
FIG. 5 is an enlarged detail sectional view showing a modification of the detail of FIG. 4.
Figure 6:
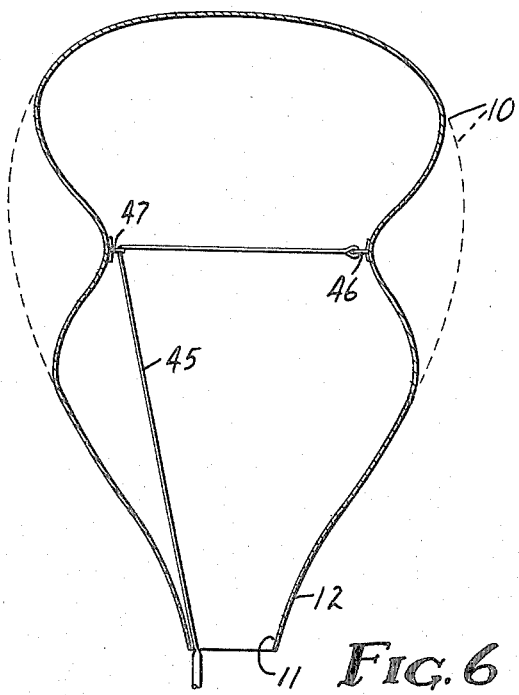
FIG. 6 is an enlarged sectional view showing the structure for maneuvering a hot air balloon.

A cable 33 is connected to a D-ring 34 attached by a strip of load tape 35 to an edge of the panel 25. The cable 33 extends from the ring 34, through a second ring 36 (see FIGS. 1 and 3) down to the basket 15. Applying a tension on the cable 33 will peel the edge of the panel 25 from the envelope to quickly open the valve allowing the gas to be exhausted through the opening 20.

Releasing the cable before all the gas is exhausted will cause the panel 25 to be drawn across the opening and against the inner surface of the tapes 14. The escaping air sometimes prevents the panel from covering the entire opening. The chance of the panel not returning to cover the entire opening and sealing the balloon when desired is diminished when the panel 25 has a radius across the tape 30 greater than the radius of the circle formed by the load tape 22. The radius would be increased by 18 inches. The additonal size affords a drape 40 with a length of about 18 inches which increases the draw for the panel over the opening 20. Additionally, a drape 41 can be sewn inside the envelope and the tape 27. This drape 41 can seal the tapes 27 and 30 at the parting line during normal operation to restrict the escape of gas therebetween and has a length sufficient to cover a portion of the opening 20 when the panel is opened.

The balloon also has a maneuvering device to assist in controlling the altitude of the balloon. In the illustrated device this is accomplished by collapsing opposite sides of the balloon to force air from the lower opening 11. This is accomplished by a cable 45 connected to a D-ring 46 secured to the inside of the envelope adjacent one side and extending through a D-ring 47 on the opposite side. The cable 45 extends to the basket 15 to be pulled forcing air from the balloon opening 11. Release of the cable 45 permits the balloon to enlarge again to lift or gain altitude.

The drapes, such as 40 and 41 could be used with panels which are of a size to seal at the load tape around the opening. This structure however would not afford a valve as well sealed under normal flight as that described.

Having described the present invention with reference to the accompanying drawing it is to be understood that modifications can be made therein without departing from the scope or spirit of the invention as defined by the appended claims.

I claim:

1. In a lighter-than-air aircraft having an envelope, formed of suitable material, inflatable with a lifting gas and having a large opening located at the upper end, a tape secured to said envelope around said opening, a valve located at said opening for permitting the gas in said envelope to pass quickly out of said opening at the termination of a flight, said valve comprising a piece of said material the dimensions of which exceed the dimensions of said opening, said piece of material being sewn within said envelope about a portion of said opening at a location conforming to but spaced from said opening perimeter, a first strip of releasable fastening tape adhered to the interior of said envelope to complete a path about said opening corresponding to the shape thereof at said spaced location, a second strip mating with said first strip of the fastening tape adhered to said material of said valve and positioned thereon to seal releasably with said first strip for holding said material across said opening to close the same and to permit the material to be peeled away from the envelope to open said opening, said piece of material also extending beyond said second strip of said fastening tape to form a drape hanging from the periphery of the valve when in normal closed position.

2. In a lighter-than-air aircraft according to claim 1, wherein a strip of material having a width greater than the spacing between said opening and said first strip of said fastening tape is sewn to the inside of said envelope inside of said second strip of said fastening tape to seal the parting line of said releasable fastening tape from the inside and to extend over a portion of said opening when said valve is opened.

3. In a lighter-than-air aircraft having an envelope, formed of suitable material, inflatable with a lifting gas and having a large opening located at the upper end, a tape secured to said envelope around said opening, a valve located at said opening for permitting the gas in said envelope to pass quickly out of said opening at the termination of a flight, said valve comprising a piece of said material the dimensions of which exceed the dimensions of said opening, said piece of material being sewn within said envelope about a portion of said opening at a location conforming to but spaced from said opening perimeter, a first strip of releasable fastening tape adhered to the interior of said envelope to complete a path about said opening corresponding to the shape thereof at said spaced location, a second strip mating with said first strip of the fastening tape adhered to said material of said valve and positioned thereon to seal releasably with said first strip for holding said material across said opening to close the same and to permit the material to be peeled away from the envelope to open said opening, and a strip of material having a width greater than the spacing between said opening and said first strip of said fastening tape with one edge sewn to the inside of said envelope inside of said first strip of said fastening tape to seal the parting line of said releasable fastening tape from the inside and to extend over a portion of said opening when said valve is opened.

4. In a lighter-than-air aircraft having an envelope, formed of suitable material, inflatable with a lifting gas and having a large opening located at the upper end, a tape secured to said envelope around said opening and load tapes extending across the top of said envelope and across said large opening, a valve located at said opening for permitting the gas in said envelope to pass quickly out of said opening at the termination of a flight, said valve comprising a piece of said material the dimensions of which exceed the dimensions of said opening, said piece of material being sewn within said envelope about a portion of said opening at a location conforming to but spaced from said opening perimeter, a first strip of releasable fastening tape adhered to the interior of said envelope to complete a path about said opening corresponding to the shape thereof at said spaced location, and a second strip mating with said first strip of the fastening tape adhered to said material of said valve to seal releasably with said first strip and hold said material across said opening to close the same and to permit the material to be peeled away from the envelope to open said opening, said aircraft further comprising strips of said releasable fastening tape corresponding to said first strip being adhered to the interior of said envelope opposite said load tapes and extending from said circle of said first strip of said releasable fastening tape to said opening.

5. In a lighter-than-air aircraft having an envelope inflatable with a lifting gas and having a large opening located at the upper end, a tape secured to said envelope around said opening to reinforce its perimeter, a valve located at said opening for permitting the rapid deflation of said envelope at the termination of a flight, said valve comprising a circular piece of suitable envelope material the diameter of which exceeds the diameter of said opening at its perimeter, said material being sewn within said envelope about a portion of said opening, a first strip of a releasable fastening tape adhered to the interior of said envelope to complete a circle about said opening, a second strip mating with said first strip of the fastening tape adhered to said material of said valve to seal releasably said material across said opening to close the same and to permit the material to be peeled away from the envelope to open said opening, and a drape comprising a length of material sewed along one edge to the interior of said envelope adjacent said first strip of said releasable fastening tape along the length of said first strip to seal the parting line between said strips of said fastening tape and to depend from the interior of said envelope to partially close said opening upon removal of said material from said opening.

6. In a lighter-than-air aircraft according to claim 5 wherein said material extends diametrically beyond said second strip of said fastening tape to form a drape which hangs downwardly into the balloon's envelope when the tapes are in mating contact to be adjacent said first drape and aid in closing the opening in the event the fastening tapes are separated.

* * * * *